(12) United States Patent
Wakabayashi et al.

(10) Patent No.: US 9,732,881 B2
(45) Date of Patent: Aug. 15, 2017

(54) GATE VALVE AND SUBSTRATE PROCESSING SYSTEM

(71) Applicant: Tokyo Electron Limited, Tokyo (JP)

(72) Inventors: Shinji Wakabayashi, Yamanashi (JP); Keisuke Kondoh, Yamanashi (JP); Norihiko Tsuji, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 160 days.

(21) Appl. No.: 14/841,882

(22) Filed: Sep. 1, 2015

(65) Prior Publication Data
US 2016/0084389 A1 Mar. 24, 2016

(30) Foreign Application Priority Data

Sep. 24, 2014 (JP) ................................. 2014-194190

(51) Int. Cl.
*F16K 49/00* (2006.01)
*F16K 3/02* (2006.01)
*F16K 51/02* (2006.01)

(52) U.S. Cl.
CPC ............ *F16K 49/002* (2013.01); *F16K 3/029* (2013.01); *F16K 3/0218* (2013.01); *F16K 51/02* (2013.01)

(58) Field of Classification Search
CPC ...... F16K 49/002; F16K 3/029; F16K 3/0218; F16K 51/02
USPC ..... 137/628, 625.33; 414/939, 217; 49/73.1, 49/74.1; 118/719, 733; 156/345.31, 156/345.32
See application file for complete search history.

(56) References Cited

U.S. PATENT DOCUMENTS

| 5,515,986 A * | 5/1996 | Turlot ................. C23C 16/5096 118/719 |
| 6,698,718 B2 * | 3/2004 | Yoo ....................... F16K 5/0407 251/181 |
| 7,059,299 B2 * | 6/2006 | Clark ...................... F02B 27/02 123/184.56 |
| 7,381,274 B2 * | 6/2008 | Lee ..................... C23C 16/4401 118/715 |
| 7,500,493 B2 * | 3/2009 | Vorenkamp ............... F02D 9/14 123/184.56 |

(Continued)

FOREIGN PATENT DOCUMENTS

JP 2014-049532 A 3/2014

*Primary Examiner* — John K Fristoe, Jr.
*Assistant Examiner* — Josephine Trinidad-Borges
(74) *Attorney, Agent, or Firm* — Abelman, Frayne & Schwab

(57) ABSTRACT

Disclosed is a gate valve that opens/closes a plurality of vertically arranged openings by a plurality of valve bodies when conveying a plurality of vertically arranged substrates to an inside of a vacuum container. The gate valve includes: a housing including the plurality of openings formed therein; a supporting member configured to support the plurality of valve bodies; a driving mechanism configured to move the plurality of valve bodies via the supporting member such that the plurality of openings is opened/closed; and a plurality of guide mechanisms arranged to correspond to the plurality of valve bodies, respectively. Each of the plurality of guide mechanisms includes: a vertically stretchable bellows fixed to the housing; and a guide member contained in the bellows and configured to guide the supporting member inside the bellows.

7 Claims, 8 Drawing Sheets

(56) References Cited

U.S. PATENT DOCUMENTS 7,622,008 B2 * 11/2009 Hiroki .................... F16K 3/029
                                                      118/719
7,637,477 B2 * 12/2009 Hiroki .............. H01L 21/67126
                                                      251/163

* cited by examiner

GATE VALVE AND SUBSTRATE PROCESSING SYSTEM

CROSS-REFERENCE TO RELATED APPLICATIONS

This application is based on and claims priority from Japanese Patent Application No. 2014-194190, filed on Sep. 24, 2014, with the Japan Patent Office, the disclosure of which is incorporated herein in their entirety by reference.

TECHNICAL FIELD

The present disclosure relates to a gate valve and a substrate processing system.

BACKGROUND

There is a substrate processing system including a vacuum chamber in which a predetermined processing is performed on a substrate. In the substrate processing system, an opening in communication with the vacuum chamber is opened/closed by a valve body of a gate valve installed between the vacuum chamber and a conveyance chamber, so that the substrate held by a conveyance arm is carried into or carried out from the vacuum chamber.

For example, in a conveyance device that conveys a plurality of substrates arranged vertically into the vacuum at once, a gate valve is installed between the vacuum chamber and the conveyance. In the gate valve, a plurality of valve bodies is arranged vertically in multi-tiers (see, e.g., Japanese Patent Laid-Open Publication No. 2014-49532). Each valve body is supported by a shaft. The shaft is elevated by a driving unit so that the valve bodies are integrally moved so as to open/close openings.

The vacuum chamber is controlled under vacuum so that the pressure therein is lower than the pressure in the conveyance chamber. Therefore, due to the difference in pressure between the vacuum and the conveyance chamber, the gate valve is applied with a pressure of approximately several hundred kg to a thousand kg from the openings depending on the number of the valve bodies. Accordingly, as an example, a mechanism is used, in which an abutment plate is installed near the valve bodies to which the pressure is applied at the time of opening/closing such that the shafts supporting the valve bodies are guided by the abutment plate to suppress a deformation amount of the shafts, thereby increasing a mechanical strength.

SUMMARY

According to an aspect, the present disclosure provides a gate valve including a plurality of valve bodies configured to open/close a plurality of vertically arranged openings when conveying a plurality of vertically arranged substrates to an inside of a vacuum container; a housing including the plurality of openings formed therein; a supporting member configured to support the plurality of valve bodies; a driving mechanism configured to move the plurality of valve bodies via the supporting member such that the plurality of openings is opened/closed; and a plurality of guide mechanisms arranged to correspond to the plurality of valve bodies, respectively. Each of the plurality of guide mechanisms includes a vertically stretchable bellows fixed to the housing; and a guide member contained in the bellows and configured to guide the supporting member inside the bellows.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
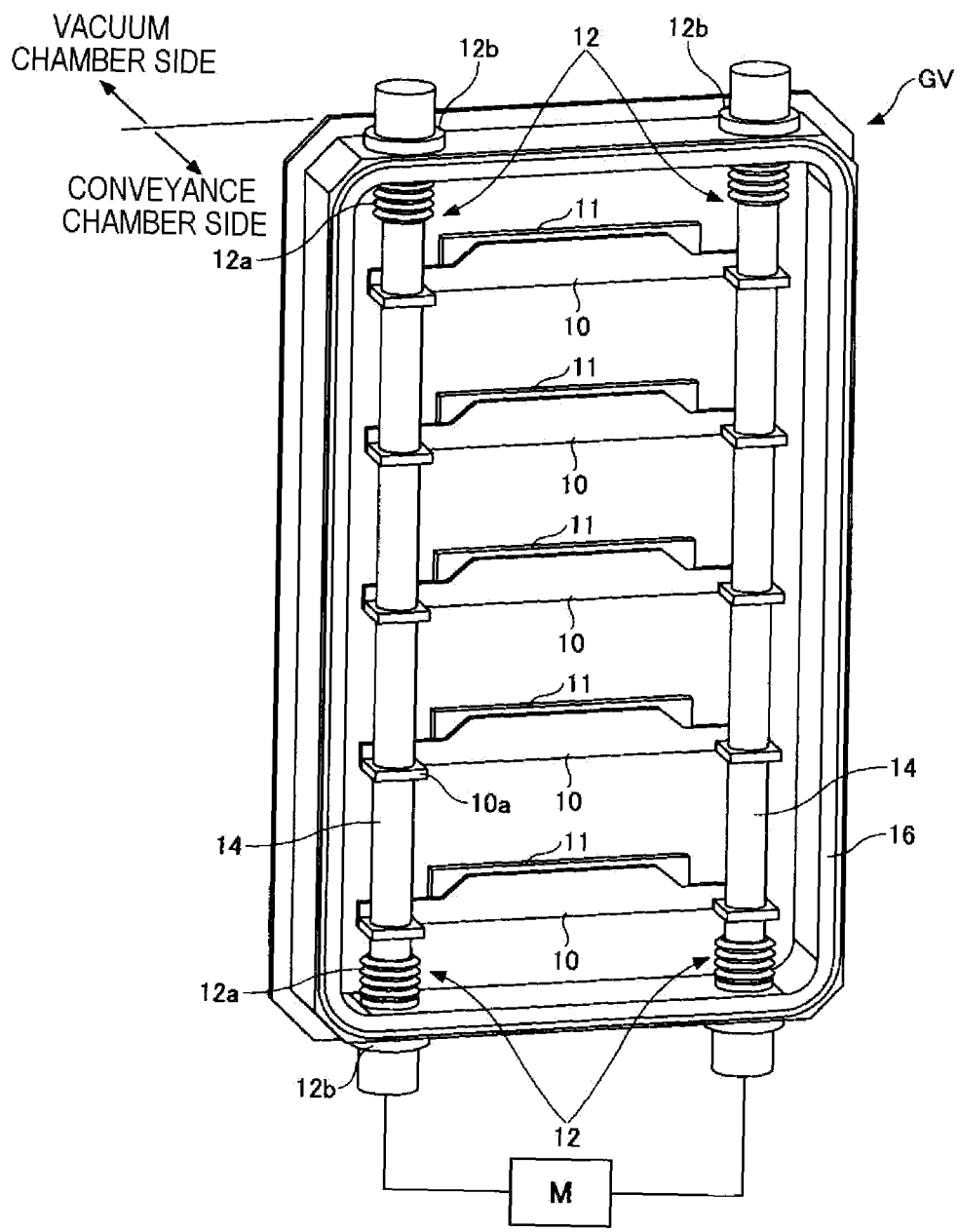
FIG. 1 is a view illustrating a gate valve according to a first exemplary embodiment.

In the following detailed description, reference is made to the accompanying drawings, which form a part hereof. The illustrative embodiments described in the detailed description, drawing, and claims are not meant to be limiting. Other embodiments may be utilized, and other changes may be made without departing from the spirit or scope of the subject matter presented here.

In the above-described mechanism, since the shafts interfere with the abutment plate, particles may be generated when the shafts and the abutment plate are rubbed, and hence, the generated particles may intrude into the vacuum chamber from the openings. The particles having intruded into the vacuum chamber may fly onto the substrate and cause a short circuit between wirings formed on the substrate, thereby reducing a yield.

In an aspect, an object of the present disclosure is to provide a gate valve which suppresses generation of particles while maintaining the mechanical strength.

According to an aspect, the present disclosure provides a gate valve including a plurality of valve bodies configured to open/close a plurality of vertically arranged openings when conveying a plurality of vertically arranged substrates to an inside of a vacuum container; a housing including the plurality of openings formed therein; a supporting member configured to support the plurality of valve bodies; a driving mechanism configured to move the plurality of valve bodies via the supporting member such that the plurality of openings is opened/closed; and a plurality of guide mechanisms arranged to correspond to the plurality of valve bodies, respectively. Each of the plurality of guide mechanisms includes a vertically stretchable bellows fixed to the housing; and a guide member contained in the bellows and configured to guide the supporting member inside the bellows.

In the gate valve described above, the supporting member is a shaft configured to support the plurality of valve bodies. The plurality of guide mechanisms guides the shaft near the plurality of valve bodies fixed on the shaft.

In the gate valve described above, each of the plurality of guide mechanisms includes a fixing member configured to fix the bellows to the housing. A contact surface between the bellows and the fixing member is joined by welding or sealed by a sealing member.

In the gate valve described above, the shaft penetrates the plurality of guide mechanisms. The guide member in each of the plurality of guide mechanisms guides the shaft penetrating inside the bellows.

The gate valve described above further includes a heating wire installed in or near the plurality of valve bodies and configured to control a temperature of the plurality of valve bodies; and a cable configured to supply a power to the heating wire.

The cable passes through the inside of the plurality of guide mechanisms and is connected to the heating wire.

In the gate valve described above, the shaft includes a height adjusting mechanism configured to adjust a height of each of the plurality of valve bodies.

According to another aspect, the present disclosure provides a substrate processing system including a gate valve configured to open/close a plurality of a vertically arranged plurality of openings by a plurality of valve bodies when conveying a plurality of vertically arranged substrates to an inside of a vacuum container. The gate valve includes a housing including the plurality of openings formed therein; a supporting member configured to support the plurality of valve bodies; a driving mechanism configured to move the plurality of valve bodies via the supporting member such that the plurality of openings is opened/closed; and a plurality of guide mechanisms arranged to correspond to the plurality of valve bodies respectively. Each of the plurality of guide mechanisms includes a vertically stretchable bellows fixed to the housing; and a guide member contained in the bellows and configured to guide the supporting member inside the bellows. Further, the gate valve is installed between a vacuum chamber and a conveyance chamber, or between the conveyance chamber and a load lock chamber.

According to an aspect, a gate valve which suppresses generation of particles while maintaining the mechanical strength, may be provided.

Hereinafter, descriptions will be made on exemplary embodiments of the present disclosure with reference to the accompanying drawings. Meanwhile, in the specification and the drawings, substantially the same components will be denoted by the same symbols, and duplicate descriptions will be omitted.

First Exemplary Embodiment

[Configuration of Gate Valve GV]

Descriptions will be made on a configuration of a gate valve GV according to a first exemplary embodiment of the present disclosure with reference to FIG. 1. The gate valve GV is installed, for example, between a vacuum chamber and a conveyance chamber. In the vacuum chamber, a desired micro-processing such as, for example, etching or film formation, is performed on a semiconductor wafer (hereinafter, referred to as a "wafer"). The wafer is held by a conveyance arm and conveyed to the vacuum chamber. When the wafer is carried into or carried out from the vacuum chamber, an opening in communication with the vacuum chamber is opened/closed by a valve body of the gate valve GV.

For example, in a conveyance device that conveys wafers arranged vertically in multi-tiers into the vacuum chamber at once, a gate valve GV of the first exemplary embodiment, in which a plurality of valve bodies 10 is correspondingly arranged vertically in multi-tiers, is used. The valve bodies 10 installed in multi-tiers are supported by shafts 14. The shafts 14 are integrally elevated by power output from a motor M. Thus, five valve bodies 10 are integrally moved vertically to open/close openings 11.

The vacuum chamber (at the back side of the plane of FIG. 1) is controlled under vacuum so that the pressure therein is lower than the pressure in the conveyance chamber (at front side of the plane of FIG. 1). Therefore, each valve body of the gate valve GV is applied with a pressure of several hundred kg per unit time from the opening 11 by the difference in pressure between the vacuum chamber and the conveyance chamber. As a result, in the gate valve GV illustrated in FIG. 1, a pressure of a thousand kg or more per unit time is applied to the five valve bodies 10.

Thus, in order to increase the mechanical strength against the pressure applied to the valve bodies 10 in the gate valve GV according to the first exemplary embodiment, guide mechanisms 12 are installed in upper portions and lower portions of two shafts 14 so as to guide the two shafts 14.

Specifically, the guide mechanisms 12 are installed on the shafts 14 that penetrate the substantially rectangular housing 16. The housing 16 includes five openings 11 in communication with the vacuum chamber, and five valve bodies 10 that are arranged correspondingly thereto, respectively. Meanwhile, the number of the valve bodies 10 is not limited to five, but two or more thereof may be arranged one-on-one with respect to two or more openings 11.

The valve bodies 10 are supported by the two shafts 14 in both end portions. Valve body connecting portions 10a are installed in both end portions of the valve bodies 10 so as to project to a side opposite to the vacuum chamber from the valve bodies 10. The shafts 14 are fixed to the valve body connecting portions 10a by, for example, welding in a state of penetrating through-holes formed in the valve body connecting portions 10a. Therefore, the five valve bodies 10 are supported by the two shafts 14 from the both ends thereof. The valve bodies 10 have a lip seal structure. Accordingly, when the valve bodies 10 are moved vertically, the openings 11 may be opened/closed without rotating the valve bodies 10. The lip seal structure of the valve bodies 10 will be described later.

The shafts 14 penetrate the upper portion and the lower portion of the housing 16, and are fixed to the housing 16 by screw members 12b in the upper and lower penetrating portions so as to be vertically movable.

Inside the housing 16, bellows 12a surrounding the outer peripheries of the shafts 14 are installed in the upper and lower penetrating portions where the shafts 14 are penetrating the housing 16, respectively. One ends of the bellows 12a are fixed to the housing 16, and the other ends thereof are fixed to the shafts 14. When the valve bodies 10 are moved vertically by elevating the shafts 14, the bellows 12a stretch or contract according to the elevation of the shafts 14. Accordingly, when the particles are generated by the friction occurring between the shafts 14 and the housing 16 at the time of the elevation of the shafts 14, the bellows 12a confine the particles therein. As a result, the particles may be suppressed from intruding into the vacuum chamber. The motor M is connected to the lower end portions of the shafts 14. The shafts 14 are elevated by the power of the motor M. The motor M is an example of a driving mechanism (actuator). As another example of the driving mechanism, an air cylinder may be exemplified. For example, a stepping motor may be used for the motor M.

In the gate valve GV having such a configuration, the particles, which are generated by the friction occurring between the shafts 14 and the housing 16 when the five valve bodies 10 are moved integrally at the time of the elevation of the two shafts 14, are confined inside the bellows 12a. Accordingly, the particles may be suppressed from intruding into the vacuum chamber. Further, the openings 11 are formed in a slit shape, which makes it possible to reduce the stroke of the motor M. As a result, the friction occurring between the shafts 14 and the housing 16 at the time of the elevation of the shafts 14 may be reduced. Further, the generation of the particles may be minimized. Further, the mechanical strength may be increased by guiding deformation of the shafts 14 by the upper and lower guide mechanisms 12. In addition, the cost may be reduced by integrally moving the five valve bodies 10.

Second Exemplary Embodiment

[Configuration of Gate Valve GV]

Meanwhile, in the gate valve GV according to the first exemplary embodiment, since the shafts 14 are guided by the upper and lower guide mechanisms 12 so as to suppress the deformation of the shafts 14, the deformation is likely to occur in the central portions of the shafts 14. Particularly, in a case of the gate valve GV in which the valve bodies 10 are installed in multi-tiers, the deformation amount of the shafts is larger as compared with a gate valve GV having a single-tier valve body 10. Therefore, in order to increase the mechanical strength of the shafts 14 to a required level, the shafts 14 need to be thick. Further, since the deformation amount of the shafts 14 is large, the friction in the upper and lower penetrating portions by the elevation of the shafts 14 increases. Therefore, there is a limit in suppressing the generation of the particles.

Figure 2:
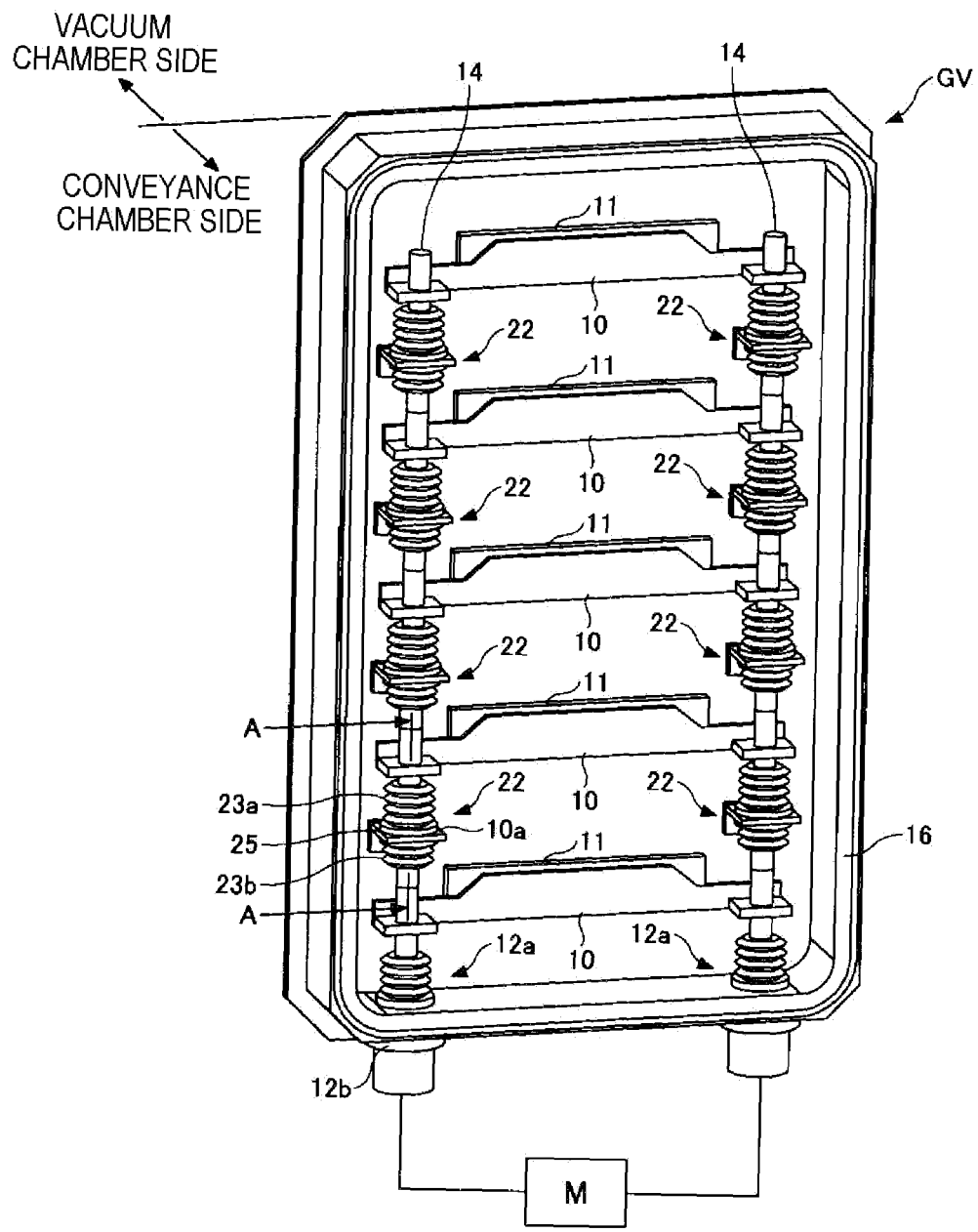
FIG. 2 is a view illustrating a gate valve according to a second exemplary embodiment.

Thus, in order to solve the above-described problems, according to a second exemplary embodiment of the present disclosure, a gate valve GV is suggested in which the gate vale GV according to the first exemplary embodiment is improved. Hereinafter, descriptions will be made on a configuration of the gate valve GV according to the second exemplary embodiment of the present disclosure with reference to FIG. 2. Meanwhile, components that are the same as those in the gate valve GV according to the first exemplary embodiment will be denoted by the same symbols.

Similarly to the gate valve GV according to the first exemplary embodiment, the gate valve GV according to the second exemplary embodiment includes a substantially rectangular housing 16. The housing 16 includes five openings 11 in communication with the vacuum chamber, and five valve bodies 10 that are arranged correspondingly thereto, respectively. The valve bodies 10 are supported by two shafts 14 in both end portions. However, the number of shafts 14 is not limited thereto, but may be one or three or more.

The shafts 14 are fixed to the valve body connecting portions 10a by, for example, welding in a state of penetrating through-holes formed in the valve body connecting portions 10a. Therefore, the five valve bodies 10 are supported by the two shafts 14 from the both ends thereof.

The shafts 14 penetrate the lower portion of the housing 16, and are fixed to the housing 16 by screw members 12b in the penetrating portions so as to be vertically movable.

The shafts 14 are an example of a supporting member that supports the plurality of valve bodies 10. The supporting member is not necessarily a shaft as long as it has a structure capable of supporting the plurality of valve bodies 10 and moving all the valve bodies 10 integrally, and may have any structure and shape.

Inside the housing 16, bellows 12a surrounding the outer peripheries of the shafts 14 are installed in the penetrating portions where the shafts 14 are penetrating the housing 16. One ends of the bellows 12a are fixed to the housing 16, and the other ends thereof are fixed to the shafts 14. The bellows 12a are stretched or contracted vertically according to the elevation of the shafts 14 at the time of opening/closing the openings 11 by the valve bodies 10. Meanwhile, the shafts 14 may penetrate the upper part of the housing, and may be fixed to the housing 16 by screw members in the penetrating portions and covered by the bellows. Accordingly, when the particles are generated by the friction occurring between the shafts 14 and the housing 16, the bellows 12a may confine the particles therein.

The motor M is connected to the lower end portions of the shafts 14. The shafts 14 are elevated by the power of the motor M. Therefore, the motor M moves the plurality of valve bodies 10 vertically via the supporting members to open/close the plurality of openings 11. The motor M is an example of a driving mechanism (actuator). The driving mechanism supplies the power for moving the plurality valve bodies 10 integrally vertically. Another example of the driving mechanism may be exemplified by an air cylinder. For example, a stepping motor may be used for the motor M.

Guide mechanisms 22, each including bellows 23a, 23b and a bracket 25, guide the two shafts 14. According to the gate valve GV of the second exemplary embodiment, a plurality of guide mechanisms 22 is installed near the plurality of valve bodies 10 fixed by the two shafts 14. The two shafts 14 penetrate the guide mechanisms 22, respectively.

(Guide Mechanism 22)

Figure 3:
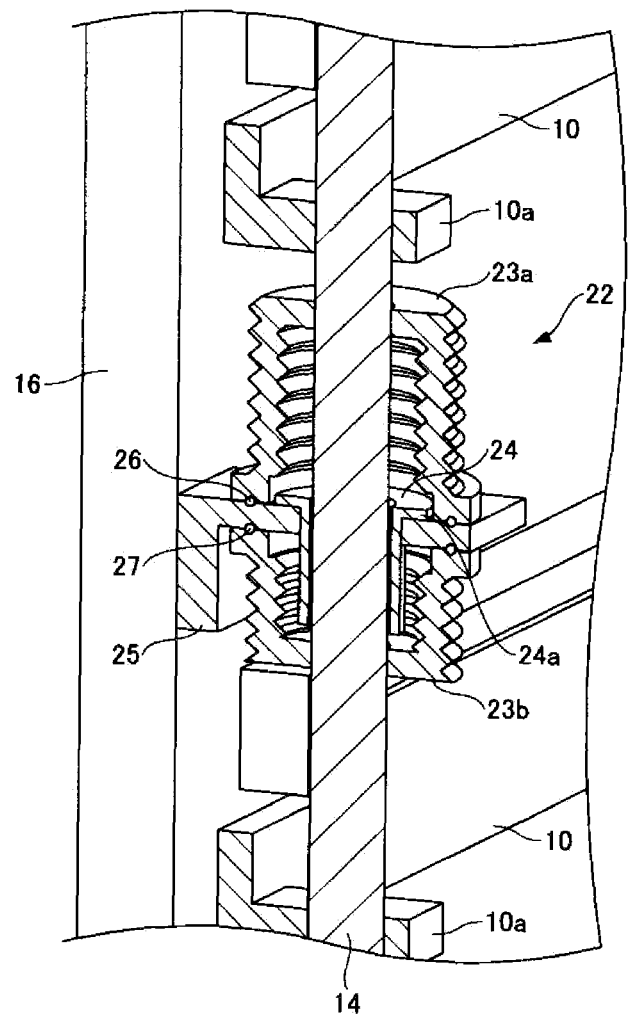
FIG. 3 is a view illustrating an exemplary guide mechanism according to an exemplary embodiment.

The configuration of a guide mechanism 22 will be further described with reference to FIG. 3. FIG. 3 is a view illustrating a guide mechanism 22 and a shaft 14 which are cut along line A-A in FIG. 2. The guide mechanism 22 includes bellows 23a, 23b, a guide member 24, a bracket 25, and O-rings 26, 27.

The shafts 14 penetrate bellows 23a, 23b and the guide member 24. The guide member 24 guides a part of the shaft 14 from the outside in the bellows 23a, 23b.

The bracket 25 is formed in an L-shape, and fixes the bellows 23a on the upper surface and the bellows 23b on the lower surface in a state where the lateral surface is fixed to the housing 16. In this manner, the bellows 23a, 23b are fixed to the housing 16 via the bracket 25. As for the fixation method, a method such as, for example, screwing, bonding, or welding may be used. Gaps between the bellows 23a, 23b and the bracket 25 are sealed by O-rings 26, 27 such that the particles generated in the bellows 23a, 23b do not escape to the outside. However, when the contact surfaces between the bellows 23a, 23b are integrated by welding, the O-rings 26, 27 are unnecessary. The O-rings 26, 27 are an example of a sealing member, and any sealing member may be used without being limited to the O-rings as long as the inside of the bellows 23a, 23b can be sealed. The bracket 25 is an example of a fixing member that fixes the bellows 23a, 23b to the housing 16. When the bellows 23a, 23b are integrated with the bracket 25, the bellows 23a, 23b have a function as a fixing member to be fixed to the housing 16 as well as a function to stretch and contract vertically.

The guide member 24 contained in the bellows 23a, 23b is a tubular member penetrated by the shaft 14, and has a flange 24a that projects outward from the upper portion. The guide member 24 is fixed to the bracket 25 in a state of being suspended to the bracket 24 by engaging the flange 24a with the bracket 25. Therefore, the guide member 24 guides the shaft 14 so as to suppress the shaft 14 from being deformed due to the pressure applied to the valve body 10.

The bellows 23a, 23b stretch and contract vertically in a state of being fixed to the shaft 14 on the upper surface of the bellows 23a and the lower surface of the bellows 23b. The particles may be generated when the guide member 24 is rubbed by the elevation of the shaft 14 in a state where the guide member is 24 is engaged with the bracket 25. However, according to the present exemplary embodiment, the guide member 24 is installed inside the bellows 23a, 23b. Therefore, the particles generated by the friction between the guide member 24 and the shaft 14 do not escape to the outside of the bellows 23a, 23b. As a result, the particles generated in the gate valve GV may be suppressed from entering the vacuum chamber from the opening 11.

As described above, according to the gate valve GV of the present exemplary embodiment, one pair of the bellows 23a, 23b and one guide member 24 are installed at every end portion of the plurality of valve bodies 10. Thus, the pressure applied to the valve bodies 10 may be dispersed by the guide member 24 installed in each end portion of the valve bodies 10, thereby suppressing the deformation of the shafts 14. Accordingly, the deformation of the shafts 14 may be effectively suppressed to reduce the deformation amount of the shafts 14, so that the friction between the shafts 14 and the guide members 24 is reduced. Therefore, the generation of particles themselves may be reduced.

(Lip Seal Structure)

The valve bodies 10 have a lip seal structure. Accordingly, the openings 11 are able to be opened/closed only by moving the valve bodies 10 vertically. That is, since it is unnecessary to rotate the valve bodies 10, the operation of the gate valve GV may be simplified.

Figure 4A:
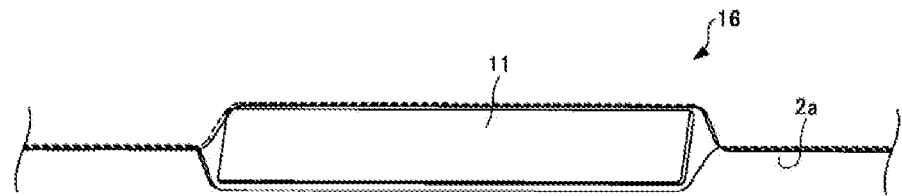
FIGS. 4A and 4B are views illustrating an exemplary valve body having a lip seal structure according to an exemplary embodiment.
Figure 4A:
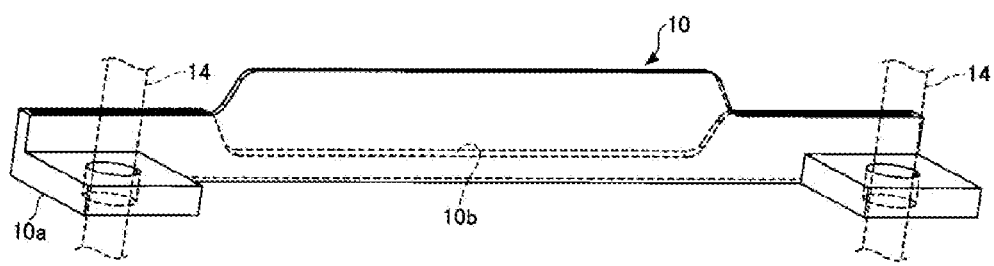
Figure 4B:
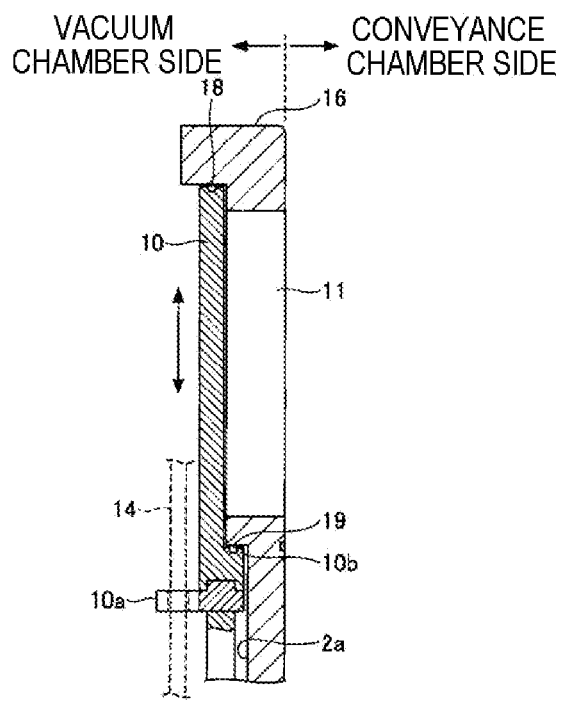

The structure of the valve bodies 10 will be described with reference to FIGS. 4A and 4B. FIG. 4A is a perspective view of a valve body 10 and an opening 11. FIG. 4B is a vertical cross-sectional view of the valve body 10 and the opening 11.

FIGS. 4A to 4B illustrate one set among a plurality of openings 11 formed in the housing 16 and a plurality of valve bodies 10 arranged one-on-one with respect to the openings 11. The lip seal structure of the valve body 10 will be described with reference thereto. Since the plurality of openings 11 and the plurality of valve bodies all have the same structure, descriptions of other sets will be omitted. The valve body 10 slides vertically in a slide space 2a formed below the opening 11, by the elevation of the shaft 14.

When the shaft moves up by the power of the motor M so that a front end of the valve body 10 comes into contact with an edge of the housing 16 formed in an upper portion of the opening 11, a projection 10b formed in a bottom portion of the valve body 10 comes into contact with an edge of the housing 16 formed in a lower portion of the opening 11. Therefore, the valve body 10 and the housing 16 are sealed by O-rings 18, 19 installed on a front end surface of the valve body 10 and an upper surface of the projection 10b, so that the opening 11 is blocked.

When the shaft 14 moves down by the power of the motor M, the valve body 10 moves down so that the opening 11 is opened. Then, the vacuum chamber and the conveyance chamber are in communication with each other. Thus, the wafer can be conveyed.

According to the present exemplary embodiment, since the lip seal structure is adopted to the valve body 10, the opening 11 is able to be opened/closed only by moving the valve body 10 vertically. Thus, rotation of the valve body 10 is not necessary for opening/closing the opening 11. Therefore, the operation of the valve body 10 may be simplified. However, the valve body 10 may have any possible structure capable of opening/closing the opening 11 without being limited to the lip seal structure. For example, the valve body 10 may require not only vertical movement but also rotation for opening/closing the opening 11.

As described above, the gate valve GV according to the second exemplary embodiment has a structure in which a plurality of guide mechanisms 22 is installed at a plurality of positions corresponding to a plurality of valve bodies 10 so as to guide the shafts 14 at a plurality of places. Therefore, the deformation of the shafts 14 generated with respect to the pressure applied to each valve body 10 due to the difference in pressure between the vacuum chamber and the conveyance chamber may be suppressed by dispersing the pressure by the plurality of guide mechanisms 22 installed near the plurality of valve bodies 10. Particularly, in a case of the gate valve GV in which the valve bodies 10 are installed in multi-tiers, the deformation amount of the shafts 14 is larger as compared with a gate valve GV having a single-tier valve body 10. However, according to such a configuration, the shafts 14 are not necessarily thick, and the deformation of the shafts 14 is suppressed by the plurality of guide mechanisms 22 installed near the plurality of valve bodies 10. Thus, the mechanical strength of the gate valve GV may be maintained.

Further, according to the guide mechanism 22 having such a configuration, the guide member 24 guiding the shaft 14 is contained in the bellows 23a, 23b. As a result, the particles generated when the guide member 24 and the shaft 14 are rubbed may be suppressed from escaping to the outside. Thus, according to the gate valve GV of the second exemplary embodiment, the generation of the particles may be suppressed while maintaining the mechanical strength.

[Modification 1: Temperature Adjusting Mechanism of Valve Body]

Figure 5:
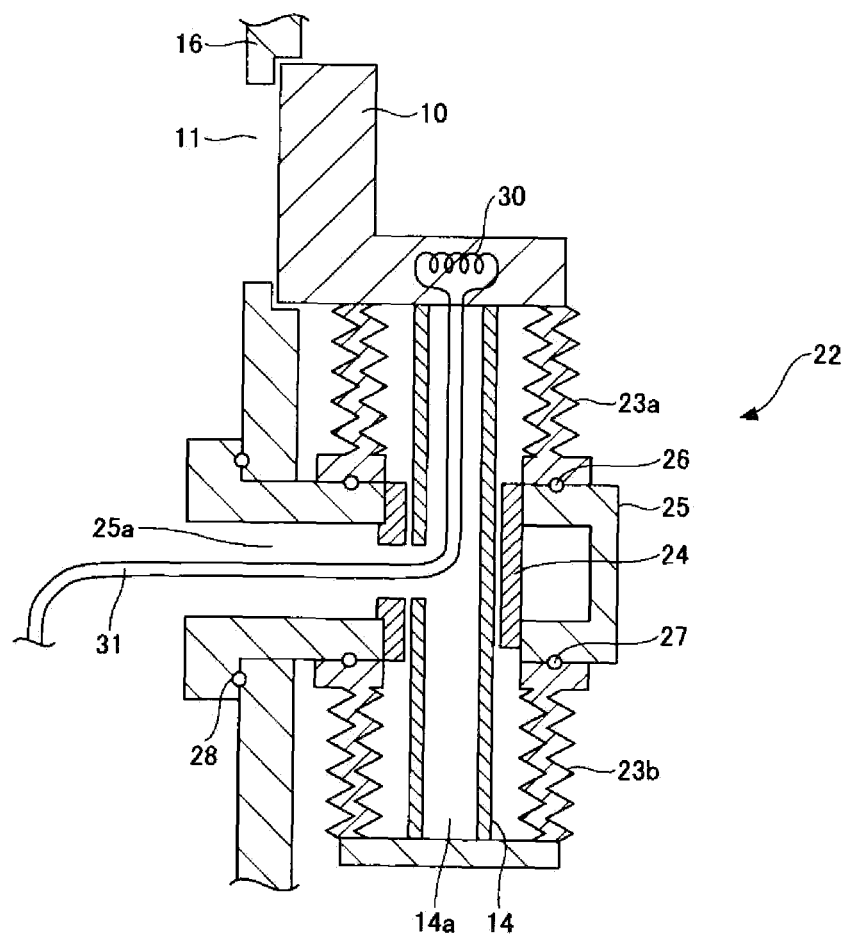
FIG. 5 is a view illustrating an exemplary temperature adjusting mechanism of the valve body according to an exemplary embodiment.

Next, descriptions will be made on Modification 1 of the gate valve GV according to the second exemplary embodiment with reference to FIG. 5. FIG. 5 illustrates one set among the plurality of valve bodies 10 and the plurality of guide mechanisms 22 formed in the gate valve GV. Since other valve bodies 10 and other guide mechanisms 22 also have the same structure, descriptions of other sets will be omitted.

In the gate valve GV of Modification 1, a heating wire 30 is installed inside the valve body 10. The heating wire 30 adjusts the temperature of the valve body 10. The heating wire 30 is connected with a cable 31 that supplies a power. The cable 31 is connected to the heating wire 30 through the inside of the guide mechanism 22. Therefore, it is possible to prevent the wiring from being exposed to a space of the gate valve GV in communication with the vacuum chamber. In particular, the valve body 10 is moved vertically at the time of opening/closing of the opening 11. As a result, since the shaft interferes with the cable 31, particles may be generated.

However, according to the gate valve GV of Modification 1, the cable 31 is able to pass through a hollow portion 25a of the bracket 25 and the inside of the bellows 23a, 23b (hereinafter, collectively referred to as a "bellows 23"). Accordingly, it is possible to locally heat the valve body 10 while suppressing the generation of particles. As a result, it is possible to suppress adhesion of reaction products to the valve body 10 by heating the valve body 10.

Meanwhile, in FIG. 5, the cable 31 passes through a hollow portion 14a of the shaft 14 that penetrates the inside of the bellows 23a, 23b. However, the cable 31 may pass through anywhere inside the bellows 23a, 23b. For example, the guide member 24 may be formed with a through-hole in communication with a space inside the bellows 23a, which is outside the shaft 14. Then, the cable 31 may be introduced through the inside of the bellows 23a from the though-hole and connected to the heating wire 30.

Figure 6:
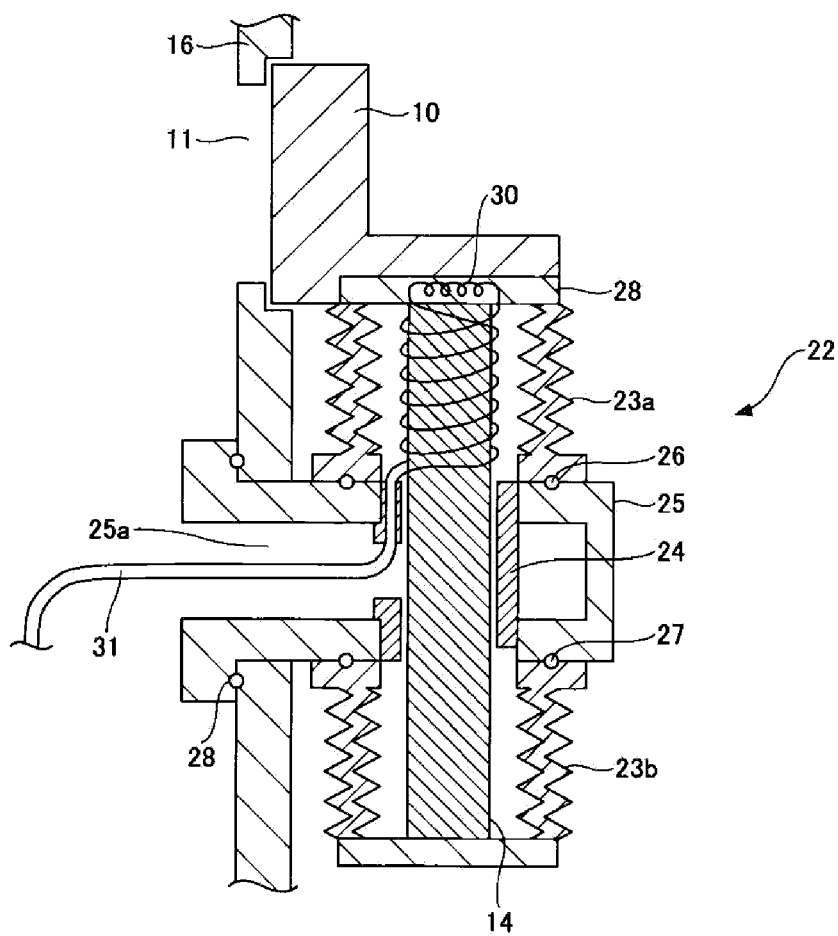
FIG. 6 is a view illustrating an exemplary temperature adjusting mechanism of the valve body according to another exemplary embodiment.

Further, for example, as illustrated in FIG. 6, the shaft 14 may be configured as a solid bar member. Then, the cable 31 may be introduced into the inside of the guide member 24 to be wound around the outside of the shaft 14, which is the inside of the bellows 23, and to be connected to the heating wire 30 in a flange 28 of the bellows 23.

[Modification 2: Height Adjusting Mechanism of Valve Body]

Figure 7:
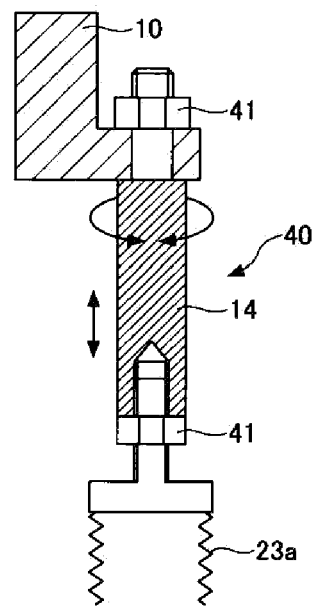
FIG. 7 is a view illustrating an exemplary height adjusting mechanism of the valve body according to an exemplary embodiment.

Next, descriptions will be made on Modification 2 of the gate valve GV according to the second exemplary embodiment with reference to FIG. 7. FIG. 7 illustrates a height adjusting mechanism 40 configured to adjust a height of one valve body 10 among the plurality of valve bodies 10 installed in the gate valve GV. Although the height adjusting mechanism 40 may be installed in the other valve bodies 10, descriptions thereof will be omitted herein.

In the gate valve GV of Modification 2, the shaft 14 has a function of the height adjusting mechanism 40 that adjusts the height of the valve body 10. Specifically, a part of the shaft 14 to which the valve body 10 is fixed is configured to be rotatable. In this manner, the height of the valve body fixed to the front end portion of the shaft 14 may be adjusted. Lock nuts 41 are provided on the top and bottom of the rotating portion of the shaft 14. The shaft 14 is fixed to the valve body 10 and the bellows 23a by the lock nuts 41.

As described above, according to the gate valve GV of Modification 2, the height of the valve body 10 may be adjusted. Thus, respective positions of the valve bodies 10 arranged in multi-tiers may be finely adjusted, so that the opening/closing of the opening 11 may be smoothly performed. As a result, adjustment at the time of maintenance of the gate valve GV may be facilitated.

[Configuration of Substrate Processing System]

Figure 8:
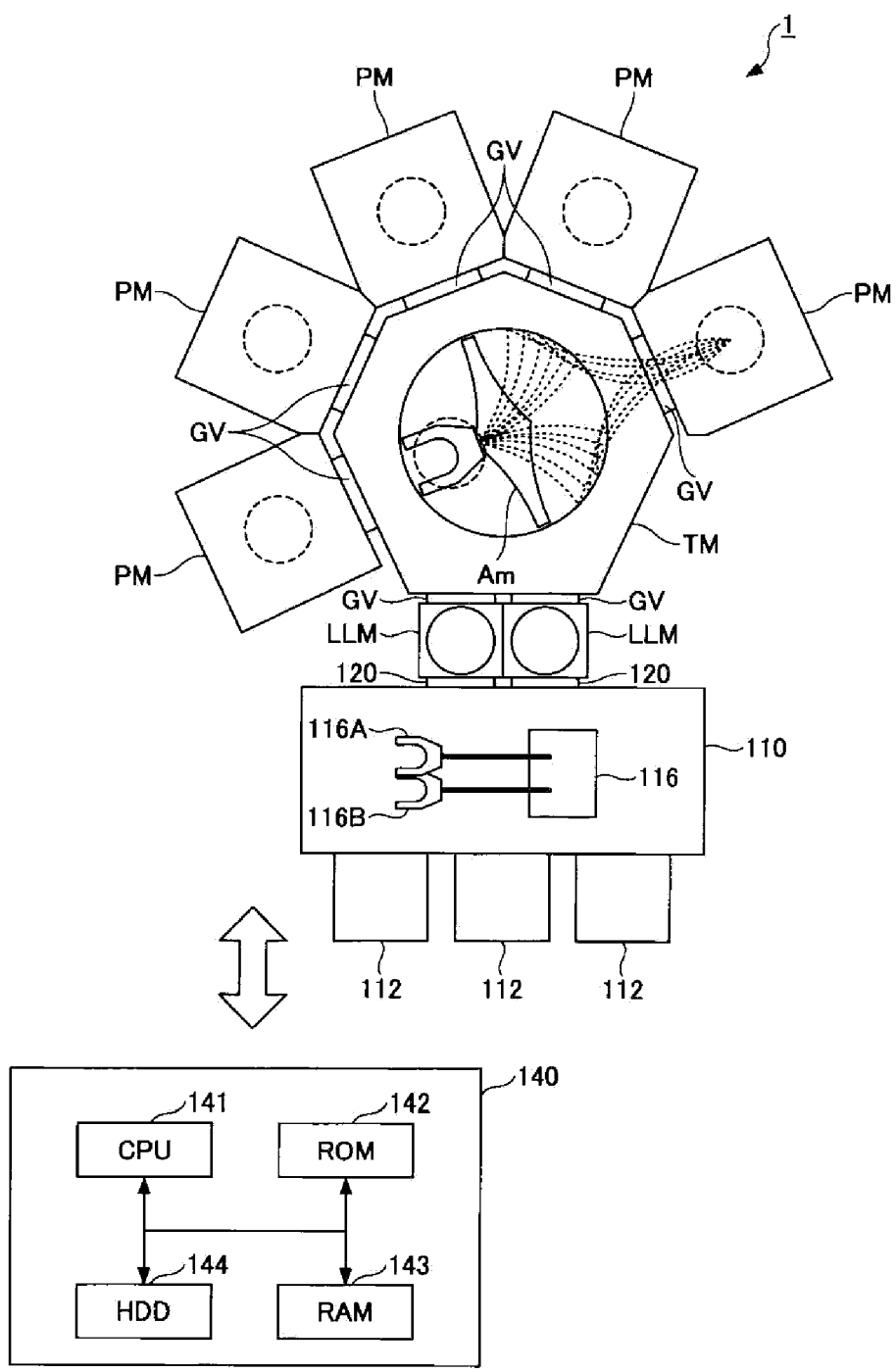
FIG. 8 is a view illustrating an exemplary substrate processing system according to an exemplary embodiment.

Finally, descriptions will be made on an exemplary configuration of a substrate processing system 1 which utilizes the gate valves GV of the second exemplary embodiment, or Modification 1 or 2, with reference to FIG. 8. As illustrated in FIG. 8, the substrate processing system 1 according to the present exemplary embodiment includes five vacuum chambers PM. Each of the five vacuum chambers PM is connected to a conveyance chamber TM via the gated valve GV. The conveyance chamber TM is connected to load lock cambers LLM via the gate valves GV. The gate valves GV of the second exemplary embodiment, or Modification 1 or 2 may be installed either between the respective vacuum chambers PM and the conveyance chamber or between the conveyance chamber TM and the respective load lock chambers LLM. In the present exemplary embodiment, the gate valves GV are installed between the respective vacuum chambers PM and the conveyance chamber and between the conveyance chamber TM and the respective load lock chambers LLM.

In the vacuum chambers PM, a desired processing is performed on wafers. The vacuum chambers PM are maintained in a desired decompressed state by a vacuum pump. An arm Am installed in the conveyance chamber TM conveys wafers arranged vertically in multi-tiers between the plurality of vacuum chambers PM and the conveyance chamber TM, and between the conveyance chamber TM and the load lock chambers LLM. The conveyance arm Am is bendable, pivotable, elevatable, and linearly movable.

Gate valves 120 are interposed in a connecting portion between the respective load lock chambers LLM and a carry-in side conveyance chamber 110. The carry-in side conveyance chamber 110 is connected with three introduction ports 112. The introduction ports 112 place a cassette capable of accommodating a plurality of wafers.

A carry-in side conveyance mechanism 116 is installed in the carry-in side conveyance chamber 110. The carry-in side conveyance mechanism 116 includes two conveyance arms 116A, 116B that hold the wafers. The conveyance arms 116A, 116B are bendable, pivotable, elevatable, and linearly movable.

A controller 140 includes a central processing unit (CPU) 141, a read only memory (ROM) 142, a random access memory (RAM) 143, and a hard disk drive (HDD) 144. The controller 140 controls the processing of the wafers which is performed in the vacuum chambers PM, the conveyance of the wafers, the elevation of the shafts 14, or the opening/closing of the gate valves GV according to a processing procedure and a conveyance procedure set in a recipe stored in the RAM 143 or the HDD 144. Meanwhile, the functions of the controller 140 may be realized using software or hardware, or combination of software and hardware.

Although the gate valve and the substrate processing system have been described using the above-described exemplary embodiments, the gate valve and the substrate processing system according to the present disclosure are not limited to the exemplary embodiments, and various modification and improvement may be achieved within the spirit of the present disclosure. Matters described in the exemplary embodiments and the modifications described above may be combined as far as it does not contradict each other.

For example, in the gate valve and the substrate processing system according to the present disclosure, a processing apparatus forming the vacuum chamber is applicable to any other semiconductor manufacturing apparatus as well as a capacitively coupled plasma (CCP) apparatus. The other semiconductor manufacturing apparatus may be, for example, an inductively coupled plasma (ICP) apparatus, a chemical vapor deposition (CVD) apparatus using a radial line slot antenna, a helicon wave plasma (HWP) apparatus, or an electron cyclotron resonance plasma (ECR) apparatus.

Further, the substrate processed by the semiconductor manufacturing apparatus according to the present disclosure is not limited to the wafer, but may be, for example, a large-scale substrate for flat panel display, an EL device, or a substrate for solar cells.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A gate valve comprising:
 a plurality of valve bodies configured to open/close a plurality of vertically arranged openings when conveying a plurality of vertically arranged substrates to an inside of a vacuum container;
 a housing including the plurality of openings formed therein;
 a supporting member configured to support the plurality of valve bodies;
 a driving mechanism configured to move the plurality of valve bodies via the supporting member such that the plurality of openings is opened/closed; and
 a plurality of guide mechanisms arranged to correspond to the plurality of valve bodies, respectively,
 wherein each of the plurality of guide mechanisms includes:
  a vertically stretchable bellows fixed to the housing; and
  a guide member contained in the bellows and configured to guide the supporting member inside the bellows.

2. The gate valve of claim 1, wherein the supporting member is a shaft configured to support the plurality of valve bodies, and
 the plurality of guide mechanisms guides the shaft near the plurality of valve bodies fixed on the shaft.

3. The gate valve of claim 2, wherein each of the plurality of guide mechanisms includes a fixing member configured to fix the bellows to the housing, and
 a contact surface between the bellows and the fixing member is joined by welding or sealed by a sealing member.

4. The gate valve of claim 2, wherein the shaft penetrates the plurality of guide mechanisms, and
 the guide member in each of the plurality of guide mechanisms guides the shaft penetrating inside the bellows.

5. The gate valve of claim 2, further comprising:
 a heating wire installed in or near the plurality of valve bodies and configured to control a temperature of the plurality of valve bodies; and
 a cable configured to supply a power to the heating wire,
 wherein the cable passes through the inside of the plurality of guide mechanisms and is connected to the heating wire.

6. The gate valve of claim 2, wherein the shaft includes a height adjusting mechanism configured to adjust a height of each of the plurality of valve bodies.

7. A substrate processing system comprising:
 a gate valve configured to open/close a plurality of vertically arranged openings by a plurality of valve bodies when conveying a plurality of vertically arranged substrates to an inside of a vacuum container,
 wherein the gate valve includes:
 a housing including the plurality of openings formed therein;
 a supporting member configured to support the plurality of valve bodies;
 a driving mechanism configured to move the plurality of valve bodies via the supporting member such that the plurality of openings is opened/closed; and
 a plurality of guide mechanisms arranged to correspond to the plurality of valve bodies, respectively,
 wherein each of the plurality of guide mechanisms includes:
  a vertically stretchable bellows fixed to the housing; and
  a guide member contained in the bellows and configured to guide the supporting member inside the bellows, and
 the gate valve is installed between a vacuum chamber and a conveyance chamber, or between the conveyance chamber and a load lock chamber.

* * * * *